United States Patent
Kanemoto et al.

(10) Patent No.: US 11,262,315 B2
(45) Date of Patent: Mar. 1, 2022

(54) ATTACHED SUBSTANCE DETERMINATION METHOD, ATTACHED SUBSTANCE DETERMINATION DEVICE, AND NON-TRANSITORY COMPUTER-READABLE STORAGE MEDIUM STORING ATTACHED SUBSTANCE DETERMINATION PROGRAM

(71) Applicant: SEIKO EPSON CORPORATION, Tokyo (JP)

(72) Inventors: Kei Kanemoto, Fujimi-machi (JP); Masashi Kanai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/130,488

(22) Filed: Dec. 22, 2020

(65) Prior Publication Data

US 2021/0190701 A1 Jun. 24, 2021

(30) Foreign Application Priority Data

Dec. 23, 2019 (JP) .............................. JP2019-231179

(51) Int. Cl.
*G01N 21/88* (2006.01)
*G01J 3/28* (2006.01)
*G06N 3/08* (2006.01)

(52) U.S. Cl.
CPC ........ *G01N 21/8851* (2013.01); *G01J 3/2823* (2013.01); *G06N 3/08* (2013.01); *G01N 2021/8887* (2013.01)

(58) Field of Classification Search
CPC ........ G01N 21/8851; G01N 2021/8887; G01J 3/2823; G06N 3/08
See application file for complete search history.

(56) References Cited

U.S. PATENT DOCUMENTS

2021/0233232 A1* 7/2021 Sugasawa .............. G01N 21/88

FOREIGN PATENT DOCUMENTS

JP 2003069851 A 3/2003

* cited by examiner

*Primary Examiner* — Jamil Ahmed
(74) *Attorney, Agent, or Firm* — Chip Law Group (57) ABSTRACT

An attached substance determination method causes a computer to determine whether or not an attached substance is attached to an inspection target object, in which the computer includes at least one processor, and the at least one processor is configured to (a) acquire, as learning data, a spectroscopic image obtained by imaging a first type sample having the attached substance attached to a base with a spectroscopic camera and a spectroscopic image obtained by imaging a second type sample having no attached substance attached to the base with the spectroscopic camera, in which spectroscopic images of a plurality of kinds of the first type samples having different kinds of the bases and different kinds of the attached substances and spectroscopic images of a plurality of kinds of the second type samples having different kinds of the bases are acquired as the learning data, (b) generate, based on the learning data, a determination model with a spectroscopic image of the inspection target object as an input and a determination result relating to presence or absence of the attached substance as an output, (c) acquire the spectroscopic image of the inspection target object, and (d) input the spectroscopic image of the inspection target object to the determination model and determine the presence or absence of the attached substance based on the determination result output from the determination model.

5 Claims, 4 Drawing Sheets

ATTACHED SUBSTANCE DETERMINATION METHOD, ATTACHED SUBSTANCE DETERMINATION DEVICE, AND NON-TRANSITORY COMPUTER-READABLE STORAGE MEDIUM STORING ATTACHED SUBSTANCE DETERMINATION PROGRAM

The present application is based on, and claims priority from JP Application Serial Number 2019-231179, filed Dec. 23, 2019, the disclosure of which is hereby incorporated by reference herein in its entirety.

BACKGROUND

1. Technical Field

The present disclosure relates to an attached substance determination method, an attached substance determination device, and a non-transitory computer-readable storage medium storing an attached substance determination program.

2. Related Art

In the related art, an attached substance determination device that detects a stain or an attached substance of a background based on an image is known (for example, see JP-A-2003-69851).

The device of JP-A-2003-69851 determines whether or not an attached substance, such as a stain, is attached to a background by a sigmoid function with a difference between an image obtained by imaging a background of a target object and a color of a background to be a reference as a variable. With this, it is possible to perform determination of a background stain conforming to a human visual characteristic.

However, when a manufacturer ships a product, when an attached substance is attached to the product, the product as a defective product cannot be shipped. The presence or absence of the attached substance also includes an attached substance that cannot be specified by a human visual sense depending on a base of a product as a background.

For example, when an ink cartridge for use in a printer has a black base, and a black ink coat is attached to the black base, attachment of ink may not be detected by a human visual characteristic. When a liquid that transmits light, such as oil, is attached, it is hard to detect the attached substance by a human visual characteristic similarly. According to the technique of JP-A-2003-69851, the stain determination conforming to the human visual characteristic is performed. Thus, in such an attached substance determination device or an attached substance determination method of the related art, it is not possible to appropriately determine an attached substance.

SUMMARY

An attached substance determination method according to a first aspect of the present disclosure causes a computer to determine whether or not an attached substance is attached to an inspection target object, in which the computer includes at least one processor, and the at least one processor is configured to (a) acquire, as learning data, a spectroscopic image obtained by imaging a first type sample having the attached substance attached to abase with a spectroscopic camera and a spectroscopic image obtained by imaging a second type sample having no attached substance attached to the base with the spectroscopic camera, in which spectroscopic images of a plurality of kinds of the first type samples having different kinds of the bases and different kinds of the attached substances and spectroscopic images of a plurality of kinds of the second type samples having different kinds of the bases are acquired as the learning data, (b) generate, based on the learning data, a determination model with a spectroscopic image of the inspection target object as an input and a determination result relating to presence or absence of the attached substance as an output, (c) acquire the spectroscopic image of the inspection target object, and (d) input the spectroscopic image of the inspection target object to the determination model and determine the presence or absence of the attached substance based on the determination result output from the determination model.

An attached substance determination device according to a second aspect of the present disclosure includes at least one processor, in which the at least one processor is configured to (a) acquire, as learning data, a spectroscopic image obtained by imaging a first type sample having an attached substance attached to a base with a spectroscopic camera and a spectroscopic image obtained by imaging a second type sample having no attached substance attached to the base with the spectroscopic camera, (b) generate, based on the learning data, a determination model with a spectroscopic image of an inspection target object as an input and a determination result relating to presence or absence of the attached substance as an output, (c) acquire the spectroscopic image of the inspection target object, and (d) input the spectroscopic image of the inspection target object to the determination model and determine the presence or absence of the attached substance based on the determination result output from the determination model, and the at least one processor is configured to further acquire, as the learning data, spectroscopic images of a plurality of kinds of the first type samples in which kinds of the base and the attached substance of the first type sample are changed and spectroscopic images of a plurality of kinds of the second type samples in which the kind of the base is changed.

A non-transitory computer-readable storage medium according to a third aspect of the present disclosure stores instructions causing at least one processor to execute (a) acquiring, as learning data, a spectroscopic image obtained by imaging a first type sample having the attached substance attached to a base with a spectroscopic camera and a spectroscopic image obtained by imaging a second type sample having no attached substance attached to the base with the spectroscopic camera, in which spectroscopic images of a plurality of kinds of the first type samples having different kinds of the bases and different kinds of the attached substances and spectroscopic images of a plurality of kinds of the second type samples having different kinds of the bases are acquired as the learning data, (b) generating, based on the learning data, a determination model with a spectroscopic image of the inspection target object as an input and a determination result relating to presence or absence of the attached substance as an output, (c) acquiring the spectroscopic image of the inspection target object, and (d) inputting the spectroscopic image of the inspection target object to the determination model and determining the presence or absence of the attached substance based on the determination result output from the determination model.

DESCRIPTION OF EXEMPLARY EMBODIMENTS

Hereinafter, an embodiment will be described.

Figure 1:
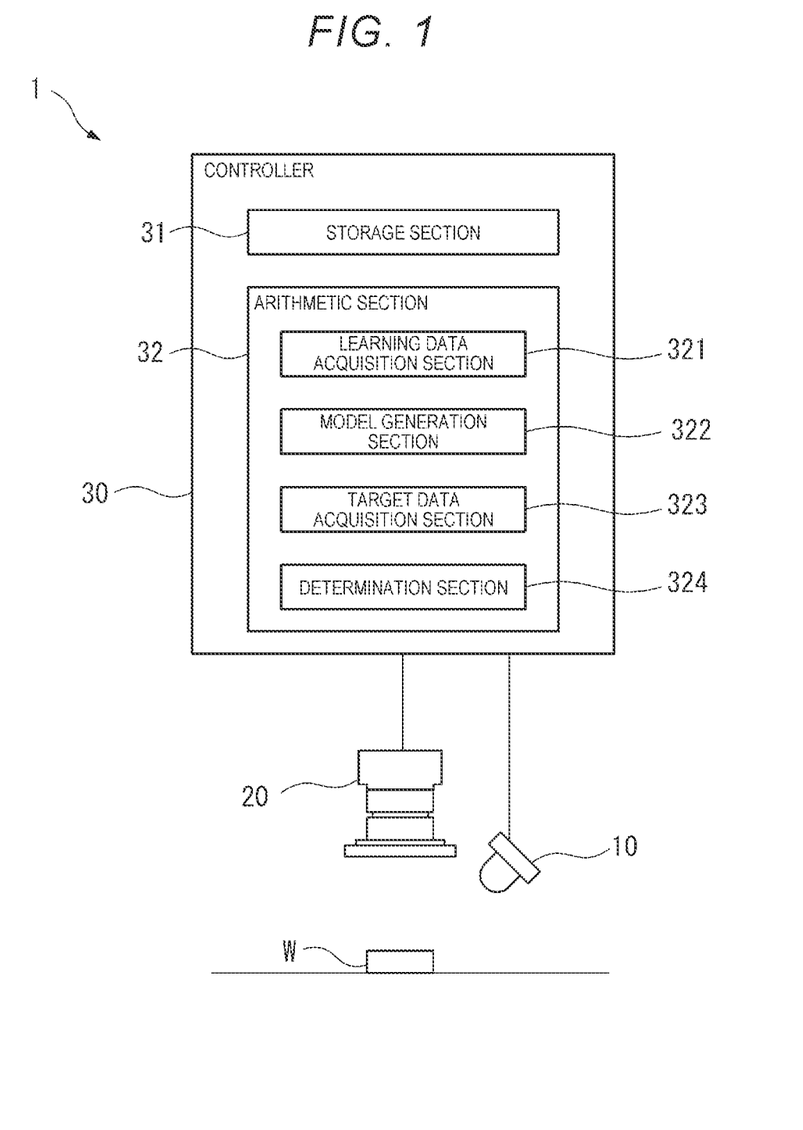
FIG. 1 is a block diagram showing a schematic configuration of an inspection device according to an embodiment of the present disclosure.

FIG. 1 is a block diagram showing a schematic configuration of an inspection device 1 that is an example of an attached substance determination device of the embodiment.

The inspection device 1 includes an illumination light source 10, a spectroscopic camera 20, and a controller 30 coupled to the spectroscopic camera 20. The inspection device 1 can be provided in, for example, a manufacturing line or the like of a factory, and inspects the presence or absence of an attached substance to an inspection target object W, such as a product. In the embodiment, an ink cartridge is used as an example of a target object, and the inspection device 1 that inspects attachment of ink to the ink cartridge is illustrated.

The inspection device 1 illuminates a target object, such as the inspection target object W, with the illumination light source 10, and captures a spectroscopic image of the inspection target object W by the spectroscopic camera 20 in a state in which an imaging environment of the target object is maintained constant. Then, the controller 30 of the inspection device 1 inputs the spectroscopic image captured by the spectroscopic camera 20 to a machine learning model (determination model) generated in advance and determines the presence or absence of an attached substance to the target object based on a determination result output from the determination model.

Hereinafter, such an inspection device 1 will be described in detail.

The illumination light source 10 is a light source that illuminates the target object to be imaged by the spectroscopic camera 20. As the illumination light source 10, it is preferable to use a white light source in which an amount of light of each wavelength of emitted light is uniform. When a transparent attached substance, such as oil, is detected, irradiation of light in an ultraviolet range or an infrared range from the illumination light source 10 may be performed.

The spectroscopic camera 20 is an imaging apparatus that captures a spectroscopic image of a target object. The spectroscopic camera 20 includes a spectroscopic element that disperses light of a predetermined wavelength from incident light, and an imaging element that receives light dispersed by the spectroscopic element.

As the spectroscopic element, for example, it is preferable to use an element that can switch a spectroscopic wavelength to a plurality of wavelengths, such as a wavelength variable Fabry-Perot etalon. With this, the spectroscopic camera 20 can switch the spectroscopic wavelength of the spectroscopic element, for example, at predetermined wavelength intervals and can capture a spectroscopic image corresponding to each spectroscopic wavelength.

The spectroscopic wavelength of the spectroscopic image captured by the spectroscopic camera 20 can be changed depending on a kind of an attached substance of the inspection target object W. For example, when a colored substance, such as ink, is detected as an attached substance, for example, a spectroscopic image corresponding to each spectroscopic wavelength per predetermined wavelength (for example, 20 nm intervals) within a visible light range of 400 nm to 700 nm is captured. When a transparent attached substance, such as oil, is inspected, spectroscopic images for a plurality of wavelengths in an ultraviolet range or spectroscopic images for a plurality of wavelengths in an infrared range may be captured.

The controller 30 is an attached substance determination device that is configured of a computer, and includes, as a hardware configuration, a storage section 31, an arithmetic section 32, and the like. The controller 30 may be coupled to an external apparatus in a communicable manner through a communication section, such as the Internet. An input operation section, such as a keyboard, and an image display section, such as a display, may be coupled to the controller 30.

The storage section 31 is an information recording device configured of, for example, a memory, a hard disk, or the like, and stores various programs including an operating system (OS) for controlling the entire operation of the controller 30 and an attached substance determination program and various kinds of data.

The storage section 31 stores the spectroscopic images captured by the spectroscopic camera 20 and a determination model that determines an attached substance based on the spectroscopic images.

The spectroscopic images also include spectroscopic images as learning data for generating the determination model in addition to the spectroscopic image of the inspection target object W.

The spectroscopic images as the learning data include spectroscopic images for a plurality of spectroscopic wavelengths of a plurality of kinds of the first type samples having an attached substance attached to abase and spectroscopic images for a plurality of spectroscopic wavelengths of a plurality of kinds of second type samples having no attached substance attached to the base.

Here, a plurality of kinds of first type samples are a plurality of kinds of samples in which the kind of the base and the kind of the attached substance are different, and a plurality of kinds of second type samples are a plurality of samples in which the kind of the base is different. The inspection device 1 of the embodiment determines attachment of ink to an ink cartridge. In this case, a different portion between the first type sample and the second type sample is a base in an ink cartridge.

Figure 2:
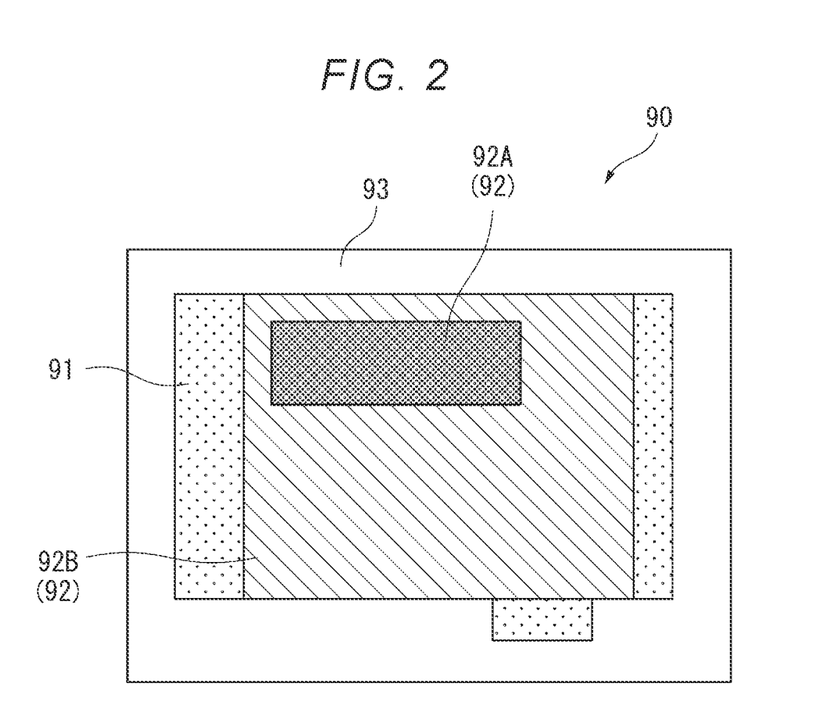
FIG. 2 is a diagram showing an example of an ink cartridge that is an inspection target object of the embodiment.

FIG. 2 is a diagram showing an example of an ink cartridge. For example, in an ink cartridge 90 shown in FIG. 2, a label 92 is pasted to a plastic exterior portion 91, and the ink cartridge 90 is sealed in a transparent pack 93. Usually, a plurality of portions with different colors are provided in the label 92. In the example of FIG. 2, the label 92 includes an ink color display portion 92A and a decorative portion 92B, and the portions have different colors of bases.

In such an ink cartridge 90, different bases are the exterior portion 91 covered with the transparent pack 93, the ink color display portion 92A covered with the transparent pack 93, the decorative portion 92B covered with the transparent pack 93, and the transparent pack 93, and each portion becomes the second type sample.

That is, the spectroscopic image of the second type sample is the spectroscopic image of each base (the exterior portion 91 covered with the transparent pack 93, the ink color display portion 92A covered with the transparent pack 93, the decorative portion 92B covered with the transparent pack 93, and the transparent pack 93) when the ink cartridge 90 having no ink attached thereto is imaged by the spectroscopic camera 20.

The first type sample is a sample having an attached substance attached to each base of such an ink cartridge 90. When ink is an attached substance, a sample having ink attached to each base of the ink cartridge 90 becomes the first type sample. On this occasion, a color of ink, an amount of ink, and a way of attachment of ink (attachment pattern) are changed. For example, a plurality of ink cartridges 90 in which a large amount of ink is coated on each base or ink cartridges 90 in which a small amount of ink equivalent to a fingerprint is attached to each base may be prepared while changing the color of ink to be attached, and a spectroscopic image of each base may be captured.

That is, the spectroscopic image of the first type sample is the spectroscopic image of each base when a plurality of ink cartridges 90 in which the color of ink to be attached to each base or the attachment pattern of ink is changed into various patterns are imaged by the spectroscopic camera 20.

As such a first type sample, for example, an ink cartridge that is determined to be defective due to attachment of an attached substance by inspection before shipment can be used.

For example, when the ink cartridges 90 of respective colors of black, cyan, magenta, yellow, light cyan, and light magenta are used as the inspection target object W by the inspection device 1, in regard to the ink cartridge 90 of each color, the spectroscopic images of the first type sample and the second type sample are acquired and stored in the storage section 31 similarly to the above.

The arithmetic section 32 is configured of an arithmetic circuit, such as a central processing unit (CPU) and a storage circuit, such as a random access memory (RAM). The arithmetic section 32 develops the programs stored in the storage section 31 to the RAM and executes various kinds of processing in cooperation with the programs developed to the RAM.

Then, the arithmetic section 32 reads and executes the attached substance determination program stored in the storage section 31, thereby functioning as a learning data acquisition section 321, a model generation section 322, a target data acquisition section 323, and a determination section 324 as shown in FIG. 1.

The learning data acquisition section 321 acquires the spectroscopic images of the first type sample and the second type sample as learning data from the spectroscopic camera 20 and stores the spectroscopic images in the storage section 31.

The model generation section 322 generates a determination model through machine learning using the learning data.

In the embodiment, with the use of the learning data described above, the model generation section 322 can generate the determination model that can determine attachment of an attached substance with high accuracy. Specifically, the model generation section 322 generates the determination model that outputs a determination result of the attached substance including the presence or absence of the attached substance, the kind of the attached substance, an attachment pattern of the attached substance, and the like for an input image.

The target data acquisition section 323 acquires the spectroscopic image of the inspection target object W captured by the spectroscopic camera 20. A spectroscopic wavelength of the spectroscopic image to be acquired is the same as the spectroscopic wavelengths of the spectroscopic images of the first type sample and the second type sample.

The determination section 324 inputs the spectroscopic image for each wavelength of the inspection target object W to the determination model and determines the presence or absence of the attached substance to an inspection target object W. The determination section 324 outputs an abnormality detection signal informing of the attachment of the attached substance when determination is made that the attached substance is present on the inspection target object W. For example, a display coupled to the controller 30 may be configured to perform display informing of the attachment of the attached substance or output sound informing of the attachment of the attached substance. When the inspection device 1 of the embodiment is used in the manufacturing line of the factory, a picking device that classifies a defective product and a good product and transports the defective product and the good product to different lines may be provided. In this case, for example, the determination section 324 may output the abnormality detection signal to the picking device, and accordingly, the picking device may transport the inspection target object W determined to be attached with the attached substance as a defective product to a line different from a good product.

Attached Substance Determination Method in Inspection Device 1 Model Generation Processing Next, an attached substance determination method of determining the presence or absence of an attached substance using the inspection device 1 described above will be described.

In the attached substance determination method of the embodiment, the inspection device 1 first executes model generation processing of generating a determination model using samples, and then, executes inspection processing of determining the presence or absence of an attached substance to the inspection target object W using the generated determination model.

Figure 3:
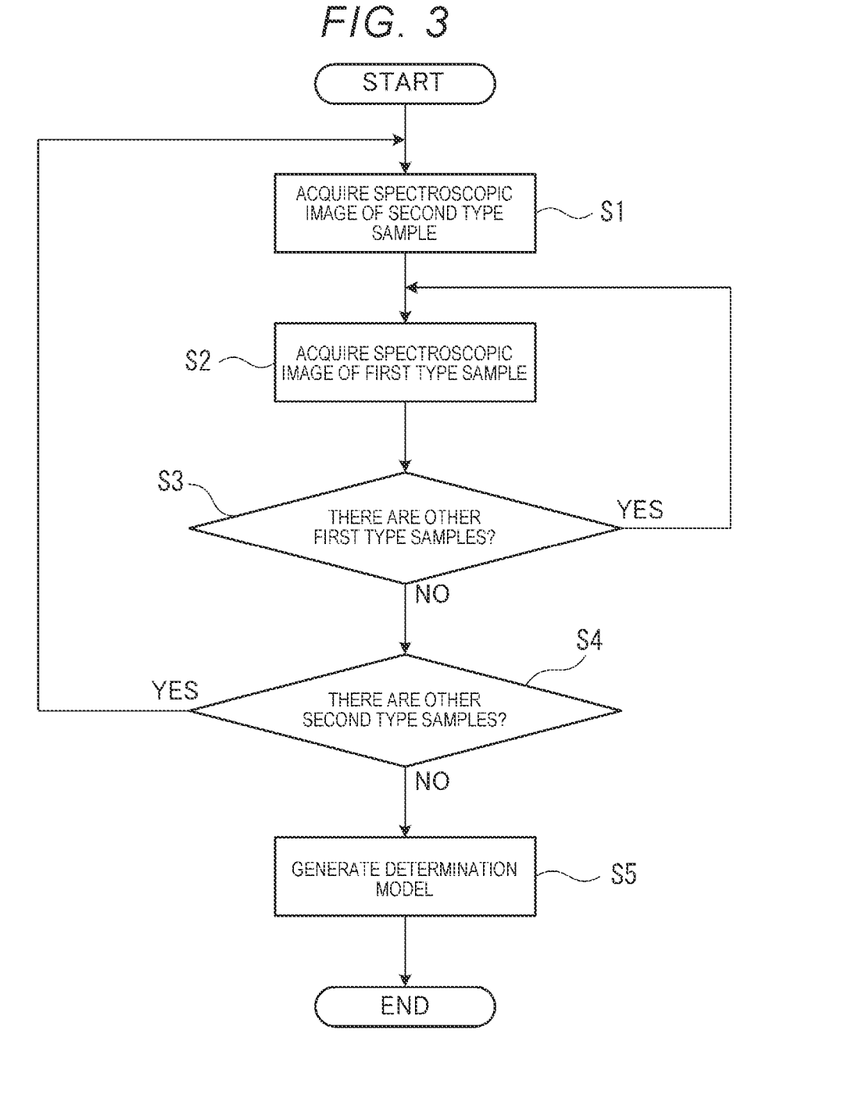
FIG. 3 is a flowchart showing model generation processing of an attached substance determination method of the embodiment.

FIG. 3 is a flowchart showing the model generation processing of the attached substance determination method of the embodiment.

In the model generation processing, an administrator of the inspection device 1 prepares a first type sample and a second type sample in advance and operates the input operation section coupled to the controller 30 to instruct the model generation processing.

With this, the learning data acquisition section 321 of the controller 30 first performs control such that the spectroscopic camera 20 acquires a spectroscopic image of the second type sample (Step S1).

In Step S1, the learning data acquisition section 321 is given notification to the effect that the second type sample is disposed at a predetermined imaging position, for example, from an image display section, a sound output section, or the like coupled to the controller 30. When the administrator of the inspection device 1 disposes the second type sample at the imaging position and performs an input to the effect that the disposition of the second type sample is completed, from the input operation section, the learning data acquisition section 321 performs control such that the spectroscopic camera 20 sequentially captures a spectroscopic image of each spectroscopic wavelength with a predetermined wavelength interval.

Next, the learning data acquisition section 321 performs control such that the spectroscopic camera 20 acquires a spectroscopic image of the first type sample corresponding to the second type sample (Step S2).

In Step S2, the learning data acquisition section 321 is informed of disposition of the first type sample, which is a sample having the same base as the second type sample imaged in Step S1 and to which the attached substance is attached, from the image display section, the sound output section, or the like. When the administrator disposes the first type sample at the imaging position and performs an input indicating completion of the disposition of the first type sample from the input operation section, the learning data acquisition section 321 performs control such that the spectroscopic camera 20 sequentially captures a spectroscopic image of each spectroscopic wavelength with a predetermined wavelength interval.

Next, the learning data acquisition section 321 determines whether or not there is another first type sample corresponding to the second type sample (Step S3). For example, the learning data acquisition section 321 is informed of disposition of another first type sample from the image display section, the sound output section, or the like. When the administrator performs an input indicating no other first type sample, determination is made to be NO in Step S3. On the other hand, when the administrator performs an input indicating deposition of another first type sample at the imaging position, the learning data acquisition section 321 determines to be YES in Step S3, returns to Step S2, and captures a spectroscopic image of another first type sample. In this way, the spectroscopic images of a plurality of first type samples are acquired for the spectroscopic image of the second type sample. The learning data acquisition section 321 stores the spectroscopic image of the second type sample and the spectroscopic images of the first type sample having the same base in the storage section 31 in association with each other.

When determination is made to be NO in Step S3, the learning data acquisition section 321 determines whether or not there is another second type sample (Step S4). For example, the learning data acquisition section 321 is informed of disposition of another second type sample from the image display section, the sound output section, or the like. When the administrator performs an input indicating no other second type sample, determination is made to be NO in Step S4. On the other hand, when the administrator performs an input indicating disposition of another second type sample at the imaging position, the learning data acquisition section 321 determines to be YES in Step S4, and returns to Step S1.

Steps S1 to S4 described above correspond to a learning data acquisition step according to the present disclosure.

In the above-described example, although the spectroscopic image of the second type sample is acquired, and then, the spectroscopic image of the first type sample is acquired, spectroscopic images of a plurality of kinds of first type samples having different kinds, attachment patterns, or the like of attached substances and the common base may be acquired, and then, a spectroscopic image of a second type sample having the same base as the first type sample may be acquired.

In the embodiment, the first type sample and the second type sample indicate portions having different bases in one object, such as the exterior portion 91 of the ink cartridge 90, the ink color display portion 92A of the label 92, the decorative portion 92B of the label, and the transparent pack 93. That is, in the embodiment, for example, the spectroscopic image of the second type sample and the spectroscopic image of the first type sample are captured for the exterior portion 91. Subsequently, the base to be imaged is changed to the ink color display portion 92A, the decorative portion 92B, and the transparent pack 93, and a spectroscopic image of each portion is captured.

In contrast, a plurality of portions may be included in a range imageable with the spectroscopic camera 20, and learning data for a plurality of bases may be acquired at a time. For example, when the whole of the exterior portion 91, the label 92, and the transparent pack 93 falls within an imaging range of the spectroscopic camera 20, the exterior portion 91, the spectroscopic images of the respective second type samples of the ink color display portion 92A, the decorative portion 92B, and the transparent pack 93 may be captured at a time. The same applies to the first type sample.

Although an example where the administrator disposes the first type sample or the second type sample at the imaging position, a configuration may be made in which learning data is acquired automatically. For example, the first type sample and the second type sample are sent to the imaging position in an order set in advance by a belt conveyor or the like. Then, the learning data acquisition section 321 sequentially captures a spectroscopic image with the spectroscopic camera 20 for a sample sent to the imaging position. In this case, when data indicating a base of the sample sent to the imaging position or whether the sample is the first type sample or the second type sample is known in advance, the imaging order of the sample is not particularly limited.

Then, when determination is made to be YES in Step S4, and the spectroscopic images of all first type samples and second type samples are acquired by the learning data acquisition section 321, the model generation section 322 generates a determination model through machine learning with the respective spectroscopic images of the first type samples and the second type samples as learning data (Step S5: model generation step).

With this, the model generation section 322 generates the determination model that receives spectroscopic images for a plurality of spectroscopic wavelengths of the inspection target object W as inputs and outputs the presence or absence of an attached substance to the inspection target object W, the kind of the attached substance, or the attachment pattern of the attached substance as a determination result, through machine learning.

In such a determination model, it is possible to accurately determine the presence or absence of the attached substance, the kind of the attached substance, the attachment pattern of the attached substance, or the like from the input spectroscopic image of the inspection target object W.

That is, when the attached substance is attached to the base, color is changed depending on the kind of the base, the color of the attached substance, or the attachment pattern of the attached substance, and change in color may not be easily recognized by a human visual characteristic. For example, when black ink is attached to a black label, it is hard to recognize an attached substance by a human visual sense. The attached substance that is hardly recognized by the human visual sense cannot be substantially distinguished, for example, even using an image sensor for color image capturing in which color filters of red (R), green (G), and blue (B) are arranged in a Bayer arrangement.

In contrast, in the embodiment, each spectroscopic image that is used as the learning data is a spectroscopic image of a narrow bandwidth with a wavelength interval of, for example, 10 nm to 20 nm, and a difference in color appears clearly by obtaining a spectroscopic spectrum of each pixel from a plurality of spectroscopic images. Accordingly, change in color when the attached substance is attached to the base can be learned through machine learning with a spectroscopic spectrum based on the spectroscopic image of the second type sample and a corresponding spectroscopic spectrum based on the spectroscopic image of the first type sample as training data.

In the embodiment, since a spectroscopic image is captured, it is possible to analyze not only a difference in spectroscopic spectrum of a place where an attached substance is attached, but also a distribution of a spectroscopic spectrum in the spectroscopic image, or the like. That is, a distribution of pixels of which the spectroscopic spectrum is different from other pixels due to the attached substance is different depending on the attachment pattern of the attached substance. Accordingly, the model generation section 322 can generate the determination model that can determine not only the color of the attached substance but also the amount or the attachment pattern of the attached substance based on a plurality of kinds of first type samples having different attachment patterns. For example, it is possible to determine an attachment pattern, such as whether the attached substance is an attached substance due to a fingerprint or the like resulting from contact of any object or an attached substance generated due to leakage or the like of ink stored in the cartridge.

In addition, when an ambient environment fluctuates, for example, when an amount of external light fluctuates, determination is made that an attached substance is present only with a spectroscopic spectrum; however, since the determination model in consideration of the distribution of the spectroscopic spectrum is generated, it is possible to perform determination of an attached substance with suppressed fluctuation of the ambient environment.

That is, the determination model of the embodiment is a model that determines the presence or absence of the attached substance, the color of the attached substance, the amount of the attached substance, and the attachment pattern of the attached substance based on the spectroscopic spectrum of each pixel, and the distribution of the spectroscopic spectrum in the image, and the like based on the input spectroscopic image of the inspection target object W.

Next, the inspection processing will be described.

Figure 4:
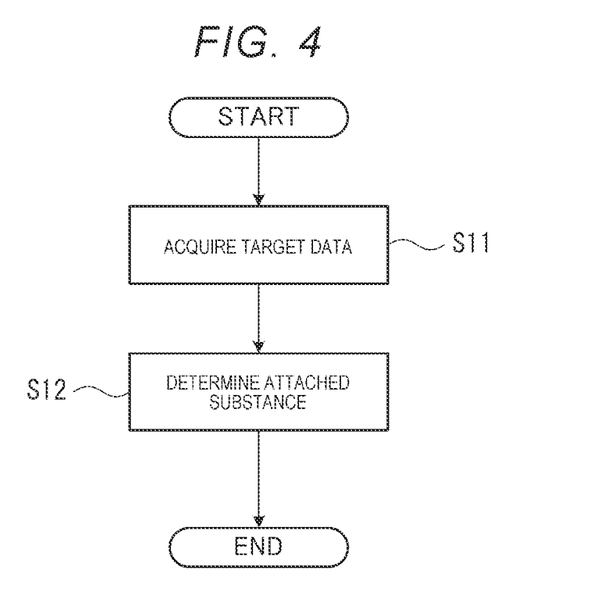
FIG. 4 is a flowchart showing inspection processing of the attached substance determination method of the embodiment.

FIG. 4 is a flowchart showing the inspection processing of the attached substance determination method of the embodiment.

In the inspection processing, the target data acquisition section 323 acquires the spectroscopic image of the inspection target object W as target data (Step S11: target data acquisition step).

That is, the administrator disposes the inspection target object W at the imaging position of the spectroscopic camera 20 and instructs acquisition of inspection target data from the input operation section. With this, the target data acquisition section 323 performs control such that the spectroscopic camera 20 captures the spectroscopic images for a plurality of spectroscopic wavelengths of the inspection target object W disposed at the imaging position. It is preferable that the spectroscopic wavelength of the spectroscopic image of the inspection target object W is the same as the spectroscopic wavelength of the spectroscopic image of each sample acquired in the learning data acquisition step of Steps S1 to S4. For example, when each wavelength obtained by dividing a visible light range at 20 nm intervals is set as the spectroscopic wavelength of the spectroscopic image of the learning data, the target data acquisition section 323 acquires the spectroscopic image of the inspection target object W of each wavelength obtained by dividing the visible light range at 20 nm intervals.

Although the inspection target object W may be only a portion of a specific base, since there is a need to inspect attachment of an attached substance on the inspection target object W as a whole, it is preferable to acquire a spectroscopic image for the whole of the inspection target object W. For example, in the ink cartridge 90, a spectroscopic image is captured such that the whole of the exterior portion 91, the label 92, and the transparent pack 93 is included in the imaging range.

Next, the determination section 324 inputs the target data acquired in Step S11 to the determination model generated in Step S5 and determines the presence or absence of the attached substance to the inspection target object W, the kind or amount of the attached substance, the attachment pattern of the attached substance, or the like based on the output determination result (Step S12).

In the embodiment, the determination section 324 can obtain the determination result and can easily and quickly determine the presence or absence of the attached substance to the inspection target object W only by inputting the target data to the determination model.

The target data includes a plurality of portions having different bases, for example, the spectroscopic images of the exterior portion 91 and the label 92. When such target data is input, the determination model determines a portion in the target data determined to be a base and a portion in the target data where the attached substance is attached to the base. In addition, the determination model can determine the color, amount, or attachment pattern of the attached substance from the spectroscopic spectrum or distribution of the portion where the attached substance is detected, and outputs the color, amount, or attachment pattern of the attached substance as a determination result. For this reason, the determination section 324 can determine the presence or absence of the attached substance, the kind or amount of the attached substance, the attachment pattern of the attached substance, or the like based on the determination result output from the determination model.

The determination section 324 may output the obtained determination result to the image display section or the like to inform of the presence or absence of the attached substance to the inspection target object W.

In addition, as described above, the inspection device 1 may be provided in a manufacturing line of a factory, and a picking device that separates a defective product from a good product may be provided in the manufacturing line. In this case, when determination is made in the determination result that the attached substance is present, the determination section 324 may output, to the picking device, the effect that the inspection target object W as a defective product is transported to a line different from a good product.

In addition, the determination section 324 may specify a cause of attachment of the attached substance or a manufacturing process, in which the attached substance is attached, based on the determination result and may output the cause or the manufacturing line to the image display section or the like.

Advantageous Effects of Embodiment

The inspection device 1 of the embodiment includes the spectroscopic camera 20, and the controller 30 that is an attached substance determination device. The controller 30 is configured of a computer including at least the storage section 31 and the arithmetic section 32, and the arithmetic section 32 reads and executes the attached substance determination program stored in the storage section 31, thereby functioning as the learning data acquisition section 321, the model generation section 322, the target data acquisition section 323, and the determination section 324. The learning data acquisition section 321 executes the learning data acquisition step of acquiring, as the learning data, the spectroscopic image obtained by imaging the first type sample having the attached substance attached to the base with the spectroscopic camera 20 and the spectroscopic image obtained by imaging the second type sample having no attached substance attached to the base with the spectroscopic camera 20. In the learning data acquisition step, the learning data acquisition section 321 acquires, as the learning data, the spectroscopic images of a plurality of kinds of first type samples having different kinds of bases and different kinds of attached substances and the spectroscopic images of a plurality of kinds of second type samples having different kinds of bases. The model generation section 322 executes the model generation step of generating, based on the learning data, the determination model with the spectroscopic image of the inspection target object W as an input and the determination result relating to the presence or absence of the attached substance as an output. The target data acquisition section 323 executes the target data acquisition step of acquiring the spectroscopic image of the inspection target object W as the target data. The determination section 324 executes the determination step of inputting the target data to the determination model and determining the presence or absence of the attached substance based on the determination result output from the determination model.

With this, determination of the attachment of the attached substance is performed based on the determination model using the spectroscopic images for each spectroscopic wavelength of a variety of samples, whereby it is possible to detect an attached substance undistinguishable by a human visual characteristic with high accuracy. Furthermore, with the use of the first type samples in which the attachment pattern of the attached substance is changed into various patterns, it is possible to determine the attachment pattern of the attached substance from the distribution of the spectroscopic spectrum of the spectroscopic image, and to determine the presence or absence of the attached substance from the spectroscopic spectrum based on the spectroscopic image and the distribution of the spectroscopic spectrum with higher accuracy.

In the inspection device 1 of the embodiment, the learning data acquisition section 321 acquires, as learning data, spectroscopic images of a plurality of kinds of first type samples having different colors of bases and spectroscopic images of a plurality of kinds of second type samples having different colors of bases in the learning data acquisition step.

For example, respective pieces of learning data when various attached substances are attached for colors of a plurality of bases, such as when black ink is attached to the black ink color display portion 92A and when black ink is attached to the gray ink color display portion 92A, or the like, are used. In this way, with the use of the first type samples having different colors of bases and the second type samples having different colors of bases, it is possible to accurately determine the presence or absence of the attached substance for every color of the bases.

In the inspection device 1 of the embodiment, the learning data acquisition section 321 acquires, as learning data, spectroscopic images of first type samples having different colors of ink as the attached substance attached to each base in the learning data acquisition step.

For example, respective pieces of learning data when attached substances of various colors are attached to the bases, such as when black ink is attached to the black ink color display portion 92A and when red ink is attached to the black ink color display portion 92A, are used. In this way, by using the first type samples having different colors of attached substances, it is possible to accurately determine the presence or absence of the attached substance for every color of the attached substances.

Modification Examples

The present disclosure is not limited to the above-described embodiment, and modifications, improvements, and the like within a range in which the purpose of the present disclosure can be achieved are included in the present disclosure.

In the above-described embodiment, although the spectroscopic images of a plurality of kinds of first type samples having different colors of bases and different colors of attached substances and the spectroscopic images of a plurality of kinds of second type samples having different colors of bases are used as the learning data, the present disclosure is not limited thereto. For example, a plurality of kinds of first type samples or second type samples in which a material of a part for forming a base or a composition of an attached substance is changed may be used.

As the attached substance, not only ink but also a transparent substance, such as oil or alcohol, may be used. In such a case, in addition to the spectroscopic images of the spectroscopic wavelengths with a predetermined wavelength interval within the visible light range, spectroscopic images of a plurality of spectroscopic wavelengths in an ultraviolet range or a plurality of spectroscopic wavelengths in an infrared range may be acquired. With this, a determination model that determines an attachment position of the transparent substance, a kind or amount of transparent substance, or an attachment pattern can be generated based on a light absorption wavelength peculiar to the transparent substance undeterminable in the visible light range. That is, the determination section 324 can also easily determine the presence or absence of a transparent attached substance, a kind of the transparent attached substance, or the like.

In the above-described embodiment, although an example where, in the learning data acquisition step of Steps S1 to S4, the spectroscopic image of the second type sample and the spectroscopic image of the first type sample are acquired in different steps and the spectroscopic images are stored in the storage section 31 in association with each other, the present disclosure is not limited thereto. For example, in the learning data acquisition step, as described above, the whole image of the ink cartridge 90 may be acquired as learning data. In this case, first type samples or second type samples corresponding to a plurality of kinds of bases are included in one captured image. That is, portions having different bases correspond to first type samples having different kinds of bases or second type samples having different kinds of bases. Among these, a portion with no ink attached thereto becomes a second type sample. When a spectroscopic image of a target object including a first type sample and a second type sample are captured, the first type sample and the second type sample are included in the same spectroscopic image. Accordingly, there is no need to separate the step of capturing the second type sample of Step S1 and the step of capturing the first type sample of Step S2. Furthermore, there is no need to store the spectroscopic image of the first type sample and the spectroscopic image of the second type sample in association with each other.

In such a case, many samples of the ink cartridge 90 are imaged while changing a kind or amount of an attached substance, an attachment pattern, or the like. With this, there is a common spectroscopic spectrum among the captured spectroscopic images of a plurality of samples, and the spectroscopic spectrum becomes a spectroscopic spectrum corresponding to the second type sample of the base with no attached substance attached thereto.

Even though an attached substance is present over a boundary portion of each base, with the use of a distribution of a spectroscopic spectrum of each pixel of the captured spectroscopic image or an edge detection technique, it is possible to determine the boundary portion of each base. For example, a boundary between the exterior portion 91 and the label 92 and a boundary between the ink color display portion 92A and the decorative portion 92B can be easily detected with an analysis technique, such as an edge detection technique. For this reason, it is also possible to easily determine a kind of a base at a position where there is an attached substance.

Accordingly, it is possible to associate a spectroscopic spectrum of a base with no attached substance attached thereto with a spectroscopic spectrum of a base with the attached substance attached thereto, and as in the above-described embodiment, to perform the generation of the determination model in the model generation section 322.

In the above-described embodiment, although the inspection device 1 that is applied to the manufacturing line of the factory is exemplified as an example, the present disclosure is not limited thereto. For example, the inspection device 1 may be used as an inspection device that detects a stain of a print medium, such as printing paper, for a printer.

CONCLUSION OF THE PRESENT DISCLOSURE

An attached substance determination method according to a first aspect of the present disclosure causes a computer to determine whether or not an attached substance is attached to an inspection target object, in which the computer includes a learning data acquisition section, a model generation section, a target data acquisition section, and a determination section, and executes a learning data acquisition step in which, in a step of acquiring, as learning data, a spectroscopic image obtained by imaging a first type sample having an attached substance attached to a base with a spectroscopic camera and a spectroscopic image obtained by imaging a second type sample having no attached substance attached to the base with the spectroscopic camera, the learning data acquisition section acquires, as the learning data, spectroscopic images of a plurality of kinds of the first type samples having different kinds of the bases and different kinds of the attached substances and spectroscopic images of a plurality of kinds of the second type samples having different kinds of the bases, a model generation step in which the model generation section generates, based on the learning data, a determination model with a spectroscopic image of the inspection target object as an input and a determination result relating to presence or absence of the attached substance as an output, a target data acquisition step in which the target data acquisition section acquires the spectroscopic image of the inspection target object, and a determination step in which the determination section inputs the spectroscopic image of the inspection target object to the determination model and determines the presence or absence of the attached substance based on the determination result output from the determination model.

The learning data acquired in the learning data acquisition step is spectroscopic images of a variety of first type samples or second type samples, and the computer can generate the determination model that can determine an attached substance undistinguishable by a human visual characteristic based on the spectroscopic images with high accuracy in the model generation step. With the use of a plurality of kinds of first type samples in which the attachment pattern of the attached substance is changed, in the model generation step, it is possible to generate the determination model that can determine the attachment pattern of the attached substance from a distribution of a spectroscopic spectrum of the spectroscopic image.

In the attached substance determination method of the aspect, in the learning data acquisition step, spectroscopic images of a plurality of kinds of the first type samples having different colors of the bases and spectroscopic images of a plurality of kinds of the second type samples having different colors of the bases may be acquired as the learning data. With this, it is possible to generate the determination model based on the learning data when the attached substance is attached for various colors of bases. With the use of such a determination model, it is possible to accurately determine the presence or absence of the attached substance without depending on the color of the base of the inspection target object.

In the attached substance determination method of the aspect, in the learning data acquisition step, spectroscopic images of a plurality of kinds of the first type samples having different colors of the attached substances may be acquired as the learning data.

With this, it is possible to generate the determination model based on the learning data when the color of the attached substance attached to the base is changed to various colors. With the use of such a determination model, it is possible to accurately determine the presence or absence of the attached substance even though any color of the attached substance is attached to the base of the inspection target object.

According to a second aspect of the present disclosure, there is provided an attached substance determination device including a learning data acquisition section that acquires, as learning data, a spectroscopic image obtained by imaging a first type sample having an attached substance attached to a base with a spectroscopic camera and a spectroscopic image obtained by imaging a second type sample having no attached substance attached to the base with the spectroscopic camera, a model generation section that generates, based on the learning data, a determination model with a spectroscopic image of an inspection target object as an input and a determination result relating to presence or absence of the attached substance as an output, a target data acquisition section that acquires the spectroscopic image of the inspection target object, and a determination section that inputs the spectroscopic image of the inspection target object to the determination model and determines the presence or absence of the attached substance based on the determination result output from the determination model, in which the learning data acquisition section acquires, as the learning data, spectroscopic images of a plurality of kinds of the first type samples in which kinds of the base and the attached substance of the first type sample are changed and spectroscopic images of a plurality of kinds of the second type samples in which the kind of the base is changed.

With this, as in the first aspect, the learning data acquisition section acquires spectroscopic images of a variety of first type samples or second type samples. Thus, the model generation section can generate the determination model that can determine an attached substance undistinguishable by a human visual characteristic based on the spectroscopic images with high accuracy. With the use of a plurality of kinds of first type samples in which the attachment pattern of the attached substance is changed, the model generation section can generate the determination model that can determine the attachment pattern of the attached substance from a distribution of a spectroscopic spectrum of the spectroscopic image. With the above, the attached substance determination device of the aspect can easily and accurately determine the presence or absence of various attached substances that cannot be determined by a human visual characteristic.

An attached substance determination program according to a third aspect of the present disclosure is an attached substance determination program that is readable and executable by a computer and causes the computer to execute the attached substance determination method according to the first aspect.

Such an attached substance determination program is read and executed by the computer, whereby the attached substance determination method can be executed by the computer as in the first aspect. Accordingly, it is possible to easily and accurately determine the presence or absence of various attached substances that cannot be determined by a human visual characteristic.

What is claimed is:

1. An attached substance determination method that causes a computer to determine whether or not an attached substance is attached to an inspection target object, wherein
    the computer includes at least one processor, and
    the at least one processor is configured to
    (a) acquire, as learning data, a spectroscopic image obtained by imaging a first type sample having the attached substance attached to a base with a spectroscopic camera and a spectroscopic image obtained by imaging a second type sample having no attached substance attached to the base with the spectroscopic camera, in which spectroscopic images of a plurality of kinds of the first type samples having different kinds of the bases and different kinds of the attached substances and spectroscopic images of a plurality of kinds of the second type samples having different kinds of the bases are acquired as the learning data,
    (b) generate, based on the learning data, a determination model with a spectroscopic image of the inspection target object as an input and a determination result relating to presence or absence of the attached substance as an output,
    (c) acquire the spectroscopic image of the inspection target object, and
    (d) input the spectroscopic image of the inspection target object to the determination model and determine the presence or absence of the attached substance based on the determination result output from the determination model.

2. The attached substance determination method according to claim 1, wherein
    the at least one processor is configured to, in (a),
    acquire, as the learning data, spectroscopic images of a plurality of kinds of the first type samples having different colors of the bases and spectroscopic images of a plurality of kinds of the second type samples having different colors of the bases.

3. The attached substance determination method according to claim 1, wherein
    the at least one processor is configured to, in (a),
    acquire, as the learning data, spectroscopic images of a plurality of kinds of the first type samples having different colors of the attached substances.

4. An attached substance determination device comprising:
    at least one processor, wherein
    the at least one processor is configured to
    (a) acquire, as learning data, a spectroscopic image obtained by imaging a first type sample having an attached substance attached to a base with a spectroscopic camera and a spectroscopic image obtained by imaging a second type sample having no attached substance attached to the base with the spectroscopic camera,
    (b) generate, based on the learning data, a determination model with a spectroscopic image of an inspection target object as an input and a determination result relating to presence or absence of the attached substance as an output,
    (c) acquire the spectroscopic image of the inspection target object, and
    (d) input the spectroscopic image of the inspection target object to the determination model and determine the presence or absence of the attached substance based on the determination result output from the determination model, and
    the at least one processor is configured to further
    acquire, as the learning data, spectroscopic images of a plurality of kinds of the first type samples in which kinds of the base and the attached substance of the first type sample are changed and spectroscopic images of a plurality of kinds of the second type samples in which the kind of the base is changed.

5. A non-transitory computer-readable storage medium storing instructions causing at least one processor to execute:
    (a) acquiring, as learning data, a spectroscopic image obtained by imaging a first type sample having the attached substance attached to a base with a spectroscopic camera and a spectroscopic image obtained by imaging a second type sample having no attached substance attached to the base with the spectroscopic camera, in which spectroscopic images of a plurality of kinds of the first type samples having different kinds of the bases and different kinds of the attached substances and spectroscopic images of a plurality of kinds of the second type samples having different kinds of the bases are acquired as the learning data;
    (b) generating, based on the learning data, a determination model with a spectroscopic image of the inspection target object as an input and a determination result relating to presence or absence of the attached substance as an output;
    (c) acquiring the spectroscopic image of the inspection target object; and
    (d) inputting the spectroscopic image of the inspection target object to the determination model and determining the presence or absence of the attached substance based on the determination result output from the determination model.

* * * * *